US012782236B2

(12) United States Patent
Su et al.

(10) Patent No.: US 12,782,236 B2
(45) Date of Patent: Nov. 3, 2026

(54) GEARBOX OFF-LINE DETECTION DEVICE, SYSTEM AND METHOD

(71) Applicant: JIANGSU XCMG STATE KEY LABORATORY TECHNOLOGY CO., LTD., Xuzhou (CN)

(72) Inventors: Junshou Su, Xuzhou (CN); Chao Zhuang, Xuzhou (CN); Leilei Gao, Xuzhou (CN); Guoguo Shi, Xuzhou (CN)

(73) Assignee: JIANGSU XCMG STATE KEY LABORATORY TECHNOLOGY CO., LTD., Xuzhou (CN)

( * ) Notice: Subject to any disclaimer, the term of this patent is extended or adjusted under 35 U.S.C. 154(b) by 252 days.

(21) Appl. No.: 18/713,816

(22) PCT Filed: Nov. 21, 2023

(86) PCT No.: PCT/CN2023/132768

§ 371 (c)(1),
(2) Date: May 28, 2024

(87) PCT Pub. No.: WO2025/030707

PCT Pub. Date: Feb. 13, 2025

(65) Prior Publication Data

US 2026/0168886 A1 Jun. 18, 2026

(30) Foreign Application Priority Data

Aug. 4, 2023 (CN) ........................ 202310977763.0

(51) Int. Cl.

*G01M 13/025* (2019.01)
*G01M 13/028* (2019.01)

(52) U.S. Cl.

CPC ........ *G01M 13/025* (2013.01); *G01M 13/028* (2013.01)

(58) Field of Classification Search

CPC ............. G01M 13/021; G01M 13/022; G01M 13/025; G01M 13/026; G01H 17/00; G05B 13/042; Y02E 10/72

See application file for complete search history.

(56) References Cited

U.S. PATENT DOCUMENTS

| | | | | |
|---|---|---|---|---|
| 2017/0241542 | A1 | 8/2017 | Parry | |
| 2023/0047604 | A1 * | 2/2023 | Christensen | ........ G01M 13/022 |

FOREIGN PATENT DOCUMENTS

| | | | |
|---|---|---|---|
| CN | 108982098 | A | 12/2018 |
| CN | 209117338 | U | 7/2019 |
| CN | 211477605 | U * | 9/2020 |

(Continued)

*Primary Examiner* — Kristina M Deherrera

(74) *Attorney, Agent, or Firm* — Dickinson Wright PLLC

(57) ABSTRACT

The present application provides a gearbox off-line detection device, system and method. The gearbox off-line detection device includes: a base; a driving motor disposed on the base and configured to be drivingly connected with a gearbox to be detected; a tooling fixture disposed on the base and configured to support the gearbox; a first load motor disposed on the base and configured to be drivingly connected with the gearbox; and a second load motor disposed on the base and configured to be drivingly connected with the gearbox. The gearbox off-line detection device, system and method provided by the application help to reproduce the problems on the whole vehicle.

17 Claims, 4 Drawing Sheets

(56) References Cited

FOREIGN PATENT DOCUMENTS

| | | | | | |
|---|---|---|---|---|---|
| CN | 114034483 | A | | 2/2022 | |
| CN | 114235395 | A | | 3/2022 | |
| CN | 114486237 | A | | 5/2022 | |
| CN | 114706297 | A | * | 7/2022 | ........... G05B 13/042 |
| CN | 117030243 | A | | 11/2023 | |

* cited by examiner

GEARBOX OFF-LINE DETECTION DEVICE, SYSTEM AND METHOD

CROSS-REFERENCE TO RELATED APPLICATIONS

This application is a national stage of International Application No. PCT/CN2023/132768, filed on Nov. 21, 2023, which is based on and claims priority to Chinese Application No. 202310977763.0, filed on Aug. 4, 2023, and titled "GEARBOX OFF-LINE DETECTION DEVICE, SYSTEM AND METHOD", wherein the entire disclosures of both of the aforementioned applications are hereby incorporated by reference in their entireties.

FIELD OF THE INVENTION

The present application relates to the field of state detection of transmission systems of construction machinery, in particular to a gearbox off-line detection device, system and method.

BACKGROUND OF THE INVENTION

Gearboxes are widely used in automobiles, construction machinery and other fields, and are usually composed of pumps, hydraulic torque converters, gears, bearings, shafts, etc. If there are deficiencies in the design, manufacture and assembly of the gearbox, resulting in unqualified products flowing into a client, it will bring economic losses in terms such as repair, return and manual troubleshooting, so that it is necessary to give an early warning to the gearbox before the unqualified products flow into the client.

At present, a number of gearboxes that are returned due to reasons such as gear shifting waiting and abnormal sound is relatively large compared to other reasons, but it is difficult to reproduce the problems on the existing gearbox off-line detection devices. The gear shifting waiting and abnormal sound are mainly judged by manual experience, which lacks quantitative detection standards and early warning methods, and the missed detection rate and false detection rate are high.

In the related art, as shown in FIG. 1, the gearbox off-line detection device used in construction machinery mostly adopts a single-input and single-output mode, including a driving motor 1, a base 2, a bracket system 3, a load motor 5 and a sensor support system 6. The gearbox 4 is supported on the bracket system 3 when it is detected by using the gearbox off-line detection device. The gearbox off-line detection device carries out running-in and inspection on the gearbox, and can complete a no-load power loss test, a working oil pressure test, a gear shifting process test and the like.

In the gearbox off-line detection device with single input and single output mode, which is different from a single-input and two-output mode of the whole vehicle, it is difficult to reproduce the problems on the whole vehicle.

SUMMARY OF THE INVENTION

An objective of the present application is to provide a gearbox off-line detection device, system and method, which are adapted to the single-input and two-output mode of a whole vehicle suitable for the gearbox, so as to help to reproduce the problems on the whole vehicle.

A first aspect of the present application provides a gearbox off-line detection device, including:

a base;

a driving motor disposed on the base and configured to be drivingly connected with a gearbox to be detected;

a tooling fixture disposed on the base and configured to support the gearbox;

a first load motor disposed on the base and configured to be drivingly connected with the gearbox; and a second load motor disposed on the base and configured to be drivingly connected with the gearbox.

In the gearbox off-line detection device according to some embodiments, the tooling fixture includes a gearbox bearing part for bearing the gearbox, and a fixed position of the gearbox bearing part is adjustable relative to the base, so that the position of the gearbox relative to the base is adjustable.

In the gearbox off-line detection device according to some embodiments, the position of the gearbox bearing part relative to the base in a vertical direction is adjustable; and/or the position of the gearbox bearing part relative to the base in a horizontal direction is adjustable.

In the gearbox off-line detection device according to some embodiments, the tooling fixture includes:

a supporting part;

a first position adjustment part connected between the base and the supporting part and configured to adjust a relative position of the supporting part with the base in the horizontal direction;

an upright post, the bottom end of which being connected with the supporting part;

the gearbox bearing part; and a second position adjustment part connected between the upright post and the gearbox bearing part and configured to adjust a relative position of the gearbox bearing part with the upright post in the vertical direction.

In the gearbox off-line detection device according to some embodiments, the first position adjustment part includes a first lead screw-nut transmission mechanism, the first lead screw-nut transmission mechanism includes a first lead screw and a first nut in threaded engagement with the first lead screw, the first lead screw extends in the horizontal direction and is rotationally disposed on the base around its own axis, and the first nut is connected to the supporting part; and/or the second position adjustment part includes a second lead screw-nut transmission mechanism, the second lead screw-nut transmission mechanism includes a second lead screw and a second nut in threaded engagement with the second lead screw, the second lead screw extends in the vertical direction and is rotationally disposed on the upright post around its own axis, and the second nut is connected to the gearbox bearing part; and/or the second position adjustment part includes a mounting seat, the gearbox bearing part is connected to the mounting seat, the upright post is provided with a plurality of rows of first connecting holes in the vertical direction, the mounting seat includes a second connecting hole selectively matched with part of first connecting holes in the plurality of rows of first connecting holes, and the mounting seat is fixedly connected with the upright post through a fixed connector penetrating the second connecting hole and the part of first connecting holes.

In the gearbox off-line detection device according to some embodiments, the second position adjustment part includes the second lead screw-nut transmission mechanism and the mounting seat, and the gearbox bearing part is connected to the mounting seat through the second lead screw-nut transmission mechanism.

In the gearbox off-line detection device according to some embodiments, the supporting part includes a tray; and/or the upright post includes H-shaped steel; and/or the number of the upright posts is two; and/or the gearbox bearing part includes a mounting plate corresponding to the upright post.

In the gearbox off-line detection device according to some embodiments, the first load motor and the second load motor are coaxially disposed on both sides of the tooling fixture.

A second aspect of the present application provides a gearbox off-line detection system, which includes the gearbox off-line detection device according to the first aspect of the present application.

In the gearbox off-line detection system according to some embodiments, the gearbox off-line detection system further includes a control device, and the control device is in signal connection with the driving motor, the first load motor and the second load motor to control actions and operation parameters of the driving motor, the first load motor and the second load motor.

In the gearbox off-line detection system according to some embodiments, the control device includes:

a controller;

a load control unit in signal connection with the controller and configured to send load parameters to the controller, the controller controlling the actions and operation parameters of the driving motor, the first load motor and the second load motor according to the load parameters;

at least one detection unit, which is in signal connection with the controller and configured to detect gearbox performance parameters of the gearbox, the controller judging whether predetermined off-line conditions are met according to the gearbox performance parameters, and forming an alarm instruction if the predetermined off-line conditions are not met; and an alarm unit, which is in signal connection with the controller and configured to send alarm information according to the alarm instruction.

In the gearbox off-line detection system according to some embodiments, the control device includes a plurality of detection units, the controller judges whether the predetermined off-line conditions are met according to the gearbox performance parameters detected by different detection units and sends different alarm instructions if the predetermined off-line conditions are not met, and the alarm unit sends different alarm information according to different alarm instructions.

In the gearbox off-line detection system according to some embodiments, the alarm unit includes a buzzer, and the different alarm information includes different color light signals sent by the buzzer.

In the gearbox off-line detection system according to some embodiments, the at least one detection unit includes:

a hydraulic torque converter detection unit configured to detect torque converter performance parameters of a hydraulic torque converter of the gearbox, wherein the gearbox performance parameters include the torque converter performance parameters, the alarm unit sends torque converter alarm information in a state that the torque converter performance parameters are inconsistent with torque converter predetermined conditions, the predetermined off-line conditions include the torque converter predetermined conditions, and the alarm information includes the torque converter alarm information; and/or a clutch pack detection unit configured to detect clutch pack performance parameters of a clutch pack of the gearbox, wherein the gearbox performance parameters include the clutch pack performance parameters, the alarm unit sends clutch pack alarm information in a state that the clutch pack performance parameters are inconsistent with clutch pack predetermined conditions, the predetermined off-line conditions include the clutch pack predetermined conditions, and the alarm information includes the clutch pack alarm information; and/or a gear shifting impact detection unit configured to detect gear shifting impact parameters of the gearbox, wherein the gearbox performance parameters include the gear shifting impact parameters, the alarm unit sends gear shifting impact alarm information in a state that the gear shifting impact parameters are inconsistent with gear shifting impact predetermined conditions, the predetermined off-line conditions include the gear shifting impact predetermined conditions, and the alarm information includes the gear shifting impact alarm information; and/or an abnormal sound detection unit configured to detect noise parameters of the gearbox, wherein the gearbox performance parameters include the noise parameters, the alarm unit sends abnormal sound alarm information in a state that the noise parameters are inconsistent with abnormal sound predetermined conditions, the predetermined off-line conditions include the abnormal sound predetermined conditions, and the alarm information includes the abnormal sound alarm information.

In the gearbox off-line detection system according to some embodiments, the hydraulic torque converter detection unit includes:

a temperature sensor configured to detect a torque converter inlet oil temperature and/or a torque converter outlet oil temperature of the hydraulic torque converter, wherein the torque converter performance parameters include the torque converter inlet oil temperature and/or the torque converter outlet oil temperature, and the torque converter predetermined conditions include that the torque converter inlet oil temperature is in a predetermined torque converter inlet temperature range and/or the torque converter outlet oil temperature is in a predetermined torque converter outlet temperature range; and/or a torque converter pressure sensor configured to detect a torque converter inlet pressure and/or a torque converter outlet pressure of the hydraulic torque converter, wherein the torque converter performance parameters include the torque converter inlet pressure and/or the torque converter outlet pressure, and the torque converter predetermined conditions include that the torque converter inlet pressure is in a predetermined torque converter inlet pressure range and/or the torque converter outlet pressure is in a predetermined torque converter outlet pressure range; and/or a rotational speed sensor configured to detect an impeller turbine rotational speed of the hydraulic torque converter, wherein the torque converter performance parameters include the impeller turbine rotational speed, and the torque converter predetermined conditions include that the impeller turbine rotational speed is in a predetermined impeller turbine rotational speed range.

In the gearbox off-line detection system according to some embodiments, the clutch pack detection unit includes a clutch pack timer, the clutch pack timer is configured to detect first time $t_F$ from the start of oil feeding to the complete elimination of a friction plate clearance of the clutch pack of the gearbox and second time $t_E$ from the start of torque transmission to stable torque transmission of the clutch pack, the clutch pack performance parameters include the first time $t_F$ and/or the second time $t_E$, the clutch pack predetermined conditions include that the first time $t_F$ is less than a predetermined first time threshold $t_1$ and/or the second time $t_E$ is less than a predetermined second time threshold $t_2$.

In the gearbox off-line detection system according to some embodiments, the clutch pack detection unit includes:

a flow sensor configured to detect a clutch pack inlet flow and/or a clutch pack outlet flow of the clutch pack; and/or a clutch pack pressure sensor configured to detect a clutch pack inlet pressure and/or a clutch pack outlet pressure of the clutch pack; and/or a torque sensor configured to detect a clutch pack output torque of the clutch pack.

In the gearbox off-line detection system according to some embodiments, the gear shifting impact detection unit includes:

a gear shifting impact counter configured to detect gear shifting delay time $t_g$; and a vibration acceleration sensor configured to detect an acceleration value of a monitoring position;

wherein the gear shifting impact parameters include the gear shifting delay time $t_g$ and the acceleration value, and the gear shifting impact predetermined conditions include that a gear shifting quality parameter a acquired according to the gear shifting delay time $t_g$ and the acceleration value is in a predetermined gear shifting quality parameter range.

In the gearbox off-line detection system according to some embodiments, the industrial controller is configured to:

acquire a gear shifting impact degree $a_c$, a gear shifting acceleration amplitude $a_f$, a gear shifting acceleration flutter $a_d$ and a gear shifting vibration dose value $a_j$ according to the acceleration value; and acquire the gear shifting quality parameter a according to the gear shifting delay time $t_g$, the gear shifting impact degree $a_c$, the gear shifting acceleration amplitude $a_f$, the shift acceleration flutter $a_d$ and the gear shifting vibration dose value $a_j$, wherein:

$$a = At_g + Ba_c + Ca_f + Da_d + Ea_j;$$

and

A, B, C, D and E are coefficients used in calculation of the gear shifting quality parameter a.

In the gearbox off-line detection system according to some embodiments, the abnormal sound detection unit includes a microphone, the microphone is configured to detect a noise value of the gearbox, the controller is configured to acquire a loudness $N_{10}$ according to the noise value, the noise parameters include the loudness $N_{10}$, and the abnormal sound predetermined conditions include that the loudness $N_{10}$ is in a predetermined loudness range.

A third aspect of the present application provides a gearbox off-line detection method for gearbox off-line detection according to the gearbox off-line detection system in the second aspect of the present application, which includes the following steps:

drivingly connecting the gearbox to be detected with the driving motor, the first load motor and the second load motor;

controlling actions and operation parameters of the driving motor, the first load motor and the second load motor according to load parameters;

acquiring gearbox performance parameters of the gearbox; and judging, according to the gearbox performance parameters, whether the gearbox meets predetermined off-line conditions, and prompting that the gearbox does not meet off-line requirements if the predetermined off-line conditions are not met.

In the gearbox off-line detection method according to some embodiments, the load parameters include whole vehicle load spectrum data of a vehicle suitable for the gearbox.

Based on the gearbox off-line detection device, system and method according to the present application, since the gearbox off-line detection device includes the driving motor, the first load motor and the second load motor, when the gearbox to be detected is tested, the gearbox can form a single-input and two-output mode, which is adapted to the single-input and two-output mode of a whole vehicle suitable for the gearbox and is beneficial to reproduce problems on the whole vehicle.

Other features and advantages of the present application will become apparent from the following detailed description of exemplary embodiments of the present application with reference to the accompanying drawings.

BRIEF DESCRIPTION OF THE DRAWINGS

Drawings illustrated herein are used for providing further understanding of the present application and form part of the present application, and illustrative embodiments of the present application and description thereof are intended for explaining instead of improperly limiting the present application. In the drawings.

DETAILED DESCRIPTION OF THE EMBODIMENTS

Figure 1:
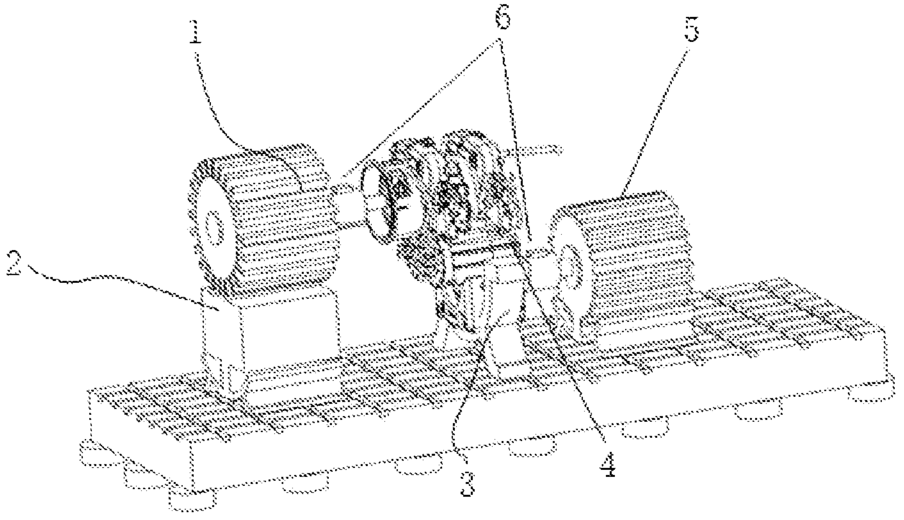
FIG. 1 is a structural schematic diagram of a gearbox off-line detection device in the prior art.

Technical solutions in the embodiments of the present application will be described below clearly and completely in conjunction with the accompanying drawings in the embodiments of the present application. Obviously, the described embodiments are only part of, instead of all of the embodiments of the present application. The following description of at least one exemplary embodiment is actually only illustrative, and in no way serves as any limitation on the present application and its application or use. Based on the embodiments in the present application, all of other embodiments obtained by those of ordinary skill in the art without creative work should fall into the protection scope of the present application.

Unless specifically stated otherwise, the relative arrangement of components and steps, numerical expressions and numerical values set forth in these embodiments do not limit the scope of the present application. Furthermore, it should be appreciated that, for ease of description, the sizes of various parts shown in the drawings are not drawn in accordance with actual proportional relationships. Technologies, methods, and devices known to those of ordinary skill in the related art may be not discussed in detail, but where appropriate, the technologies, methods, and equipment should be regarded as part of the specification. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

In the description of the present application, it should be understood that the use of terms such as “first” and “second” to define parts and components is only for the convenience of distinguishing the corresponding parts and components. Unless otherwise stated, the above terms have no special meanings, and therefore cannot be construed as limitations on the protection scope of the present application.

In description of the present application, it should be understood that orientation or position relations denoted by terms such as “front”, “rear”, “upper”, “lower”, “left”, “right”, “transverse”, “longitudinal”, “vertical”, “horizontal”, “top” and “bottom” are generally orientation or position relations illustrated based on the drawings, and are merely for the convenience of describing the present application and simplifying description, and unless stated to the contrary, such terms do not indicate or imply the denoted devices or elements must have specific orientations or be constructed and operated in specific orientations, and thus cannot be construed as limiting the protection scope of the present application; and orientation terms “inner” and “outer” refer to the inside and outside with respect to the contour of each component itself.

Figure 2:
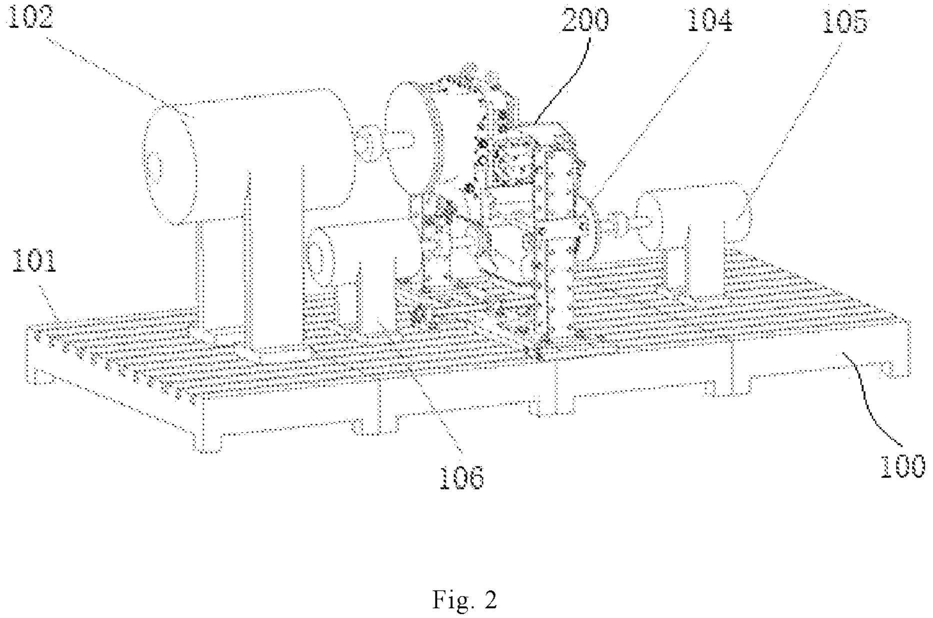
FIG. 2 is a structural schematic diagram of a gearbox off-line detection device according to an embodiment of the present application.
Figure 3:
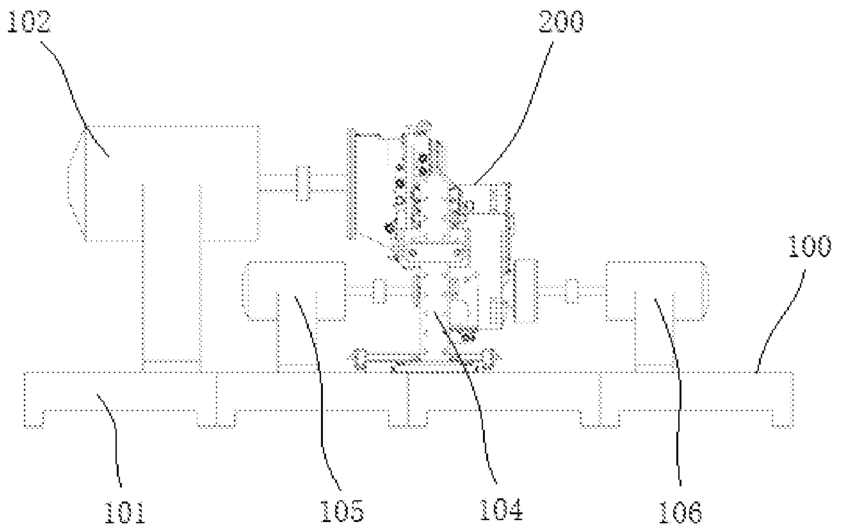
FIG. 3 is a schematic front view of the gearbox off-line detection device shown in FIG. 2.
Figure 4:
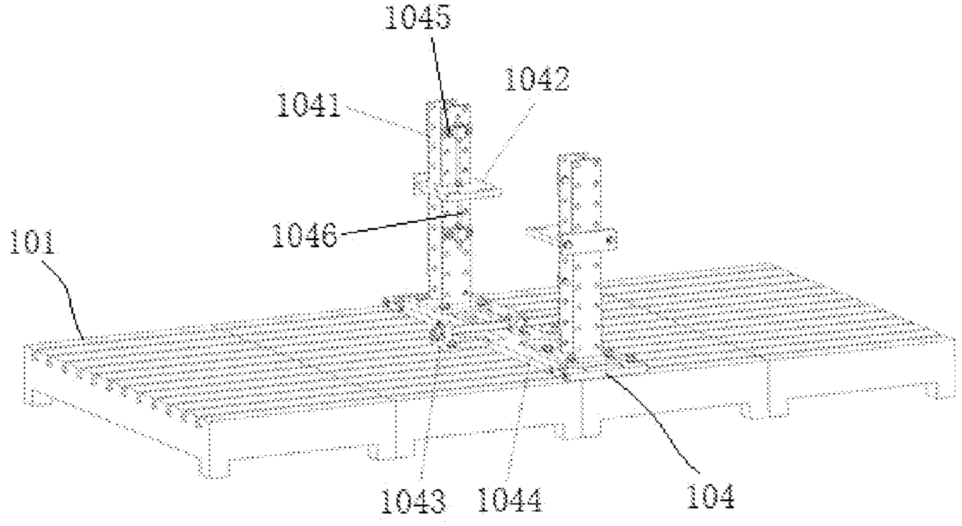
FIG. 4 is a schematic structural diagram of a tooling fixture in the gearbox off-line detection device shown in FIG. 2.

As shown in FIGS. 2 to 4, the present application provides a gearbox off-line detection device 100, which includes a base 101, a driving motor 102, a tooling fixture 104, a first load motor 105 and a second load motor 106. The driving motor 102 is disposed on the base 101 and configured to be drivingly connected with a gearbox 200 to be detected. The tooling fixture 104 is disposed on the base 101 and configured to support the gearbox 200. The first load motor 105 is disposed on the base 101 and configured to be drivingly connected with the gearbox 200. The second load motor 106 is disposed on the base 101 and configured to be drivingly connected with the gearbox 200.

Based on the gearbox off-line detection device according to the embodiments of the present application, since the gearbox off-line detection device 100 includes the driving motor 102, the first load motor 105 and the second load motor 106, when the gearbox 200 to be detected is tested, the gearbox 200 can form a single-input and two-output mode, which is adapted to the single-input and two-output mode of a whole vehicle suitable for the gearbox 200, and is beneficial to reproduce problems on the whole vehicle.

As shown in FIGS. 2 to 4, in the gearbox off-line detection device 100 according to some embodiments, the tooling fixture 104 includes a gearbox bearing part for bearing the gearbox 200, and the gearbox bearing part is disposed in an adjustable fixed position relative to the base 101, so that the position of the gearbox 200 relative to the base 101 is adjustable.

The adjustable position of the gearbox 200 relative to the base 101 is beneficial to improve the adaptability of the gearbox off-line detection device 100 to the gearboxes 200 of different specifications and sizes, thereby facilitating off-line detection of the gearboxes 200 of different specifications and sizes.

As shown in FIGS. 2 to 4, in the gearbox off-line detection device 100 according to some embodiments, the position of the gearbox bearing part relative to the base 101 in a vertical direction is adjustable; and/or the position of the gearbox bearing part relative to the base 101 in a horizontal direction is adjustable.

The adjustable position of the gearbox bearing part relative to the base 101 in the vertical direction is beneficial to improve the adaptability of the gearbox off-line detection device 100 to the gearboxes 200 of different heights; and the adjustable position of the gearbox bearing part relative to the base 101 in the horizontal direction is beneficial to improve the adaptability of the gearbox off-line detection device 100 to the gearboxes 200 of different axial sizes.

As shown in FIGS. 2 to 4, in the gearbox off-line detection device 100 according to some embodiments, the tooling fixture 104 includes a supporting part, a first position adjustment part, an upright post, the gearbox bearing part and a second position adjustment part. The first position adjustment part is connected between the base 101 and the supporting part and configured to adjust a relative position of the supporting part with the base 101 in the horizontal direction. The bottom end of the upright post is connected with the supporting part. The second position adjustment part is connected between the upright post and the gearbox bearing part and is configured to adjust the relative position of the gearbox bearing part with the upright post in the vertical direction.

The first position adjustment part and the second position adjustment part are disposed and beneficial to respectively adjust the position of the gearbox 200 relative to the base 101 in the vertical direction and the position of the gearbox 200 relative to the base 101 in the horizontal direction, thereby facilitating accurate and rapid adjustment of the position of the gearbox 200.

As shown in FIGS. 2 to 4, in the gearbox off-line detection device 100 according to some embodiments, the first position adjustment part includes a first lead screw-nut transmission mechanism 1043, the first lead screw-nut transmission mechanism 1043 includes a first lead screw and a first nut in threaded engagement with the first lead screw, the first lead screw extends in the horizontal direction and is rotationally disposed on the base 101 around its own axis, and the first nut is fixed on the supporting part; and/or the second position adjustment part includes a second lead screw-nut transmission mechanism 1046, the second lead screw-nut transmission mechanism 1046 includes a second lead screw and a second nut in threaded engagement with the second lead screw, the second lead screw extends in the vertical direction and is rotationally disposed on the upright post around its own axis, and the second nut is connected to the gearbox bearing part; and/or the second position adjustment part includes a mounting seat 1045, and the gearbox bearing part is connected to the mounting seat 1045. A plurality of rows of first connecting holes are disposed in the upright post in the vertical direction, the mounting seat 1045 includes a second connecting hole selectively matched with part of first connecting holes in the plurality of rows of first connecting holes, and the mounting seat 1045 is fixedly connected with the upright post through a fixed connector penetrating the second connecting hole and the part of first connecting holes.

The first position adjustment part includes the first lead screw-nut transmission mechanism 1043, and the position between the supporting part and the base 101 in the horizontal direction can be adjusted steplessly by rotating the first lead screw, so that the position of the gearbox bearing part relative to the base 101 in the horizontal direction is adjusted steplessly.

The second position adjustment part includes the second lead screw-nut transmission mechanism 1046, and the position between the gearbox bearing part and the upright post in the vertical direction can be adjusted steplessly by rotating the second lead screw, so that the position of the gearbox bearing part relative to the base 101 in the vertical direction is steplessly adjusted.

The second position adjustment part includes the mounting seat 1045, and the position between the gearbox bearing part and the upright post in the vertical direction can be adjusted by changing the first connecting holes matched with the second connecting hole, so that the position of the gearbox bearing part relative to the base 101 in the vertical direction is adjusted.

As shown in FIGS. 2 to 4, in the gearbox off-line detection device 100 according to some embodiments, the second position adjustment part includes the second lead screw-nut transmission mechanism 1046 and the mounting seat 1045, and the gearbox bearing part is connected to the mounting seat 1045 through the second lead screw-nut transmission mechanism 1046.

The second position adjustment part includes the second lead screw-nut transmission mechanism 1046 and the mounting seat 1045, which is beneficial to increase a stepless adjustment range of the gearbox bearing part through position change of the mounting seat 1045 and improve the adaptability of the gearbox off-line detection device 100 to the gearboxes 200 of different heights.

In an embodiment not shown, both the first position adjustment part and the second position adjustment part may be disposed in other forms, for example, the first position adjustment part or the second position adjustment part may include a jackscrew structure, a wedge block structure, a driving cylinder, a linear motor and the like.

As shown in FIGS. 2 to 4, in the gearbox off-line detection device 100 according to some embodiments, the supporting part includes a tray 1044; and/or the upright post includes H-shaped steel 1041; and/or the number of the upright posts is two; and/or the gearbox bearing part includes a mounting plate 1042 corresponding to the upright post.

The supporting part includes the tray 1044, the upright post includes the H-shaped steel 1041 and the gearbox bearing part includes the mounting plate 1042 corresponding to the upright post, so that the tooling fixture 104 is easy for material acquisition, processing and manufacturing and assembling and position adjustment. The number of the upright posts is two, and the gearbox bearing part includes the mounting plates 1042 corresponding to the upright posts, which are favorable for the stability of an assembling process of the gearbox 200 and the tooling fixture 104 and the tooling fixture 104 to stably bear the gearbox 200 after assembling.

In an embodiment not shown, the supporting part, the upright post and the gearbox bearing part may all be disposed in other forms, for example, the supporting part may be disposed in a frame form; the shape of a bearing surface of the upright post in the horizontal direction may be in the shape of a square cylinder, a cylinder or a groove; and the gearbox bearing part may be in a frame form, a double-rod or multi-rod support form and the like.

As shown in FIGS. 2 to 3, in the gearbox off-line detection device 100 according to some embodiments, the first load motor 105 and the second load motor 106 are coaxially disposed on both sides of the tooling fixture 104.

As shown in FIGS. 2-4 and FIGS. 6-7, the embodiment of the present application also provides a gearbox off-line detection system, including the gearbox off-line detection device 100 in the first aspect of the present application.

The gearbox off-line detection system according to the embodiment of the application has the advantages of the gearbox off-line detection device according to the embodiments of the present application.

Figure 6:
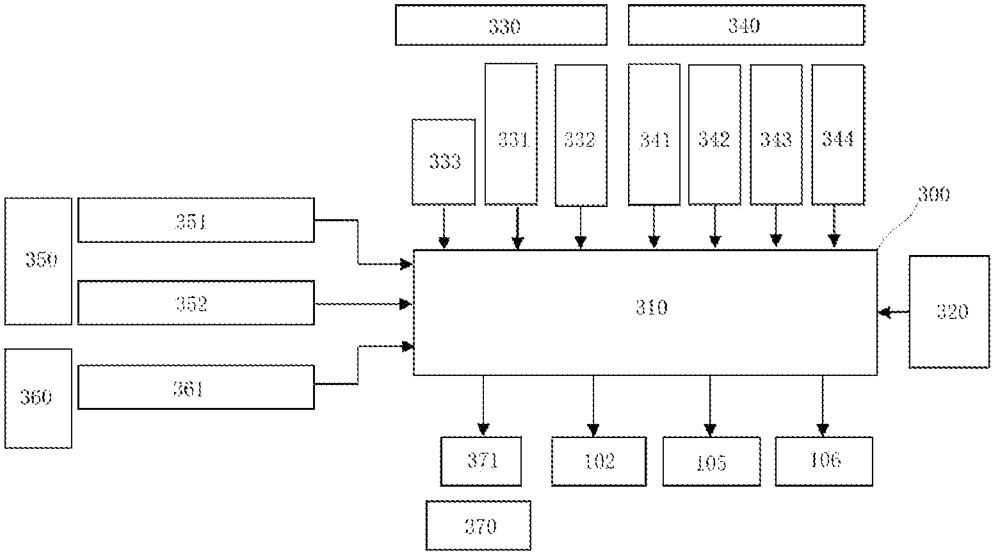
FIG. 6 is a schematic diagram of a principle of a control device of a gearbox off-line detection system according to an embodiment of the present application.

As shown in FIG. 6, in the gearbox off-line detection system according to some embodiments, the gearbox off-line detection system further includes a control device 300, and the control device 300 is in signal connection with the driving motor 102, the first load motor 105 and the second load motor 106 to control actions and operation parameters of the driving motor 102, the first load motor 105 and the second load motor 106.

As shown in FIG. 6, in the gearbox off-line detection system according to some embodiments, the control device 300 includes a controller 310, a load control unit 320, at least one detection unit and an alarm unit 370.

The load control unit 320 is in signal connection with the controller 310 and is configured to send load parameters to the controller 310. The controller 310 controls the actions and operation parameters of the driving motor 102, the first load motor 105 and the second load motor 106 according to the load parameters.

The at least one detection unit is in signal connection with the controller 310 and configured to detect gearbox performance parameters of the gearbox 200. The controller 310 judges whether predetermined off-line conditions are met according to the gearbox performance parameters, and forms an alarm instruction if the predetermined off-line conditions are not met.

The alarm unit 370 is in signal connection with the controller 310, and is configured to send alarm information according to the alarm instruction to prompt that the gearbox 200 does not meet off-line requirements.

The predetermined off-line conditions may be set according to design requirements of the gearbox 200.

Figure 7:
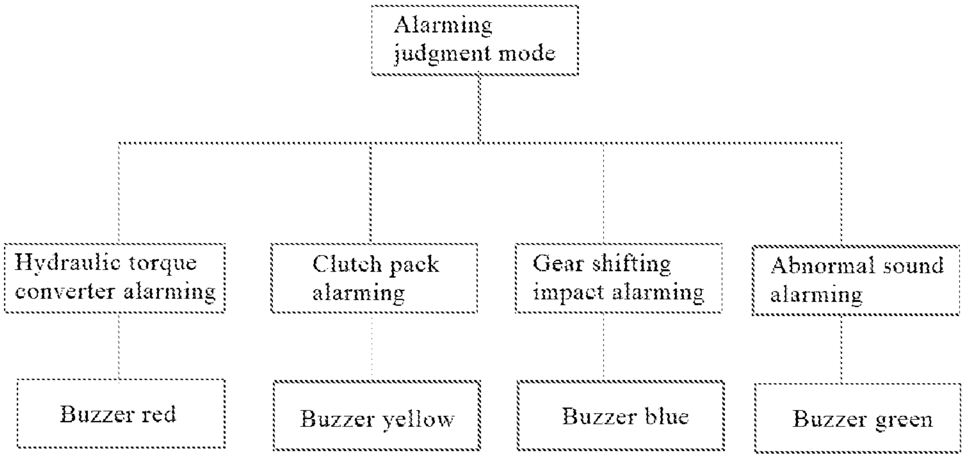
FIG. 7 is a schematic diagram of a control principle of alarm control of an alarm unit in a gearbox off-line detection system according to an embodiment of the present application.

As shown in FIGS. 6 and 7, in the gearbox off-line detection system according to some embodiments, the control device 300 includes a plurality of detection units, the controller 310 judges whether the predetermined off-line conditions are met according to the gearbox performance parameters detected by different detection units and sends different alarm instructions if the predetermined off-line conditions are not met, and the alarm unit 370 sends different alarm information according to different alarm instructions.

As shown in FIGS. 6 and 7, in the gearbox off-line detection system according to some embodiments, the alarm unit 370 includes a buzzer 371, and different alarm information includes different color light signals sent by the buzzer 371.

As shown in FIGS. 6 and 7, in the gearbox off-line detection system according to some embodiments, the at least one detection unit includes at least one of a hydraulic torque converter detection unit 330, a clutch pack detection unit 340, a gear shifting impact detection unit 350 or an abnormal sound detection unit 360.

The hydraulic torque converter detection unit 330 is configured to detect torque converter performance parameters of a hydraulic torque converter of the gearbox 200. The gearbox performance parameters include the torque converter performance parameters. The alarm unit 370 sends torque converter alarm information in a state that the torque converter performance parameters are inconsistent with torque converter predetermined conditions. The predetermined off-line conditions include the torque converter predetermined conditions, and the alarm information includes the torque converter alarm information.

The clutch pack detection unit 340 is configured to detect clutch pack performance parameters of a clutch pack of the gearbox 200. The gearbox performance parameters include the clutch pack performance parameters. The alarm unit 370 sends clutch pack alarm information in a state that the clutch pack performance parameters are inconsistent with clutch pack predetermined conditions. The predetermined off-line conditions include the clutch pack predetermined conditions, and the alarm information includes the clutch pack alarm information.

The gear shifting impact detection unit 350 is configured to detect gear shifting impact parameters of the gearbox 200. The gearbox performance parameters include the gear shifting impact parameters. The alarm unit 370 sends gear shifting impact alarm information in a state that the gear shifting impact parameters are inconsistent with gear shifting impact predetermined conditions. The predetermined off-line conditions include the gear shifting impact predetermined conditions, and the alarm information includes the gear shifting impact alarm information.

The abnormal sound detection unit 360 is configured to detect noise parameters of the gearbox 200. The gearbox performance parameters include the noise parameters. The alarm unit 370 sends abnormal sound alarm information in a state that the noise parameters are inconsistent with abnormal sound predetermined conditions. The predetermined off-line conditions include the abnormal sound predetermined conditions, and the alarm information includes the abnormal sound alarm information.

The gearbox off-line detection system can collect a plurality of performance parameters of the gearbox, such as the hydraulic torque converter performance parameters, the clutch pack performance parameters, the gear shifting impact parameters and the noise parameters, and give early warning to corresponding problems respectively.

As shown in FIG. 6, in the gearbox off-line detection system according to some embodiments, the hydraulic torque converter detection unit 330 includes at least one of a temperature sensor 331, a torque converter pressure sensor 332 or a rotational speed sensor 333.

The temperature sensor 331 is configured to detect a torque converter inlet oil temperature and/or a torque converter outlet oil temperature of the hydraulic torque converter. The torque converter performance parameters include the torque converter inlet oil temperature and/or the torque converter outlet oil temperature. The torque converter predetermined conditions include that the torque converter inlet oil temperature is in a predetermined torque converter inlet temperature range and/or the torque converter outlet oil temperature is in a predetermined torque converter outlet temperature range.

The torque converter pressure sensor 332 is configured to detect a torque converter inlet pressure and/or a torque converter outlet pressure of the hydraulic torque converter. The torque converter performance parameters include the torque converter inlet pressure and/or the torque converter outlet pressure. The torque converter predetermined conditions include that the torque converter inlet pressure is in a predetermined torque converter inlet pressure range and/or the torque converter outlet pressure is in a predetermined torque converter outlet pressure range.

The rotational speed sensor 333 is configured to detect an impeller turbine rotational speed of the hydraulic torque converter. The torque converter performance parameters include the impeller turbine rotational speed. The torque converter predetermined conditions include that the impeller turbine rotational speed is in a predetermined impeller turbine rotational speed range.

As shown in FIG. 6, in the gearbox off-line detection system according to some embodiments, the clutch pack detection unit 340 includes a clutch pack timer 341. The clutch pack timer 341 is configured to detect first time $t_F$ from the start of oil feeding to the complete elimination of a friction plate clearance of the clutch pack of the gearbox 200 and second time $t_E$ from the start of torque transmission to stable torque transmission of the clutch pack. The clutch pack performance parameters include the first time $t_F$ and/or the second time $t_E$. The clutch pack predetermined conditions include that the first time tr is less than a predetermined first time threshold $t_1$ and/or the second time $t_E$ is less than a predetermined second time threshold $t_2$.

In the gearbox off-line detection system according to some embodiments, the clutch pack detection unit 340 includes at least one of a flow sensor 342, a clutch pack pressure sensor 343 or a torque sensor 344. The flow sensor 342 is configured to detect a clutch pack inlet flow and/or a clutch pack outlet flow of the clutch pack.

The clutch pack pressure sensor 343 is configured to detect a clutch pack inlet pressure and/or a clutch pack outlet pressure of the clutch pack.

The torque sensor 344 is configured to detect a clutch pack output torque of the clutch pack.

As shown in FIG. 6, in the gearbox off-line detection device 100 according to some embodiments, the gear shifting impact detection unit 350 includes a gear shifting impact counter 351 and a vibration acceleration sensor 352.

The gear shifting impact counter 351 is configured to detect gear shifting delay time $t_g$. The vibration acceleration sensor 352 is configured to detect an acceleration value of a monitoring position. The gear shifting impact parameters include the gear shifting delay time $t_g$ and the acceleration value. The gear shifting impact predetermined conditions include that a gear shifting quality parameter a acquired according to the gear shifting delay time $t_g$ and the acceleration value is in a predetermined gear shifting quality parameter range.

In the gearbox off-line detection system according to some embodiments, the controller 310 is configured to: acquire a gear shifting impact degree $a_c$, a gear shifting acceleration amplitude $a_f$, a gear shifting acceleration flutter $a_d$ and a gear shifting vibration dose value $a_j$ according to the acceleration value; and acquire the gear shifting quality parameter a according to the gear shifting delay time $t_g$, the gear shifting impact degree $a_c$, the gear shifting acceleration amplitude $a_f$, the shift acceleration flutter $a_d$ and the gear shifting vibration dose value $a_j$, wherein, $a=At_g+Ba_c+Ca_f+Da_d+Ea_j$, and A, B, C, D and E are coefficients used in calculation of the gear shifting quality parameter a.

As shown in FIG. 6, in the gearbox off-line detection system according to some embodiments, the abnormal sound detection unit 360 includes a microphone 361. The microphone 361 is configured to detect a noise value of the gearbox 200. The controller 310 is configured to acquire a loudness $N_{10}$ according to the noise value. The noise parameters include the loudness $N_{10}$, and the abnormal sound predetermined conditions include that the loudness $N_{10}$ is in a predetermined loudness range.

The embodiment of the application also provides a gearbox off-line detection method for gearbox off-line detection according to the gearbox off-line detection system in the second aspect of the present application. The gearbox off-line detection method includes:

- drivingly connecting the gearbox 200 to be detected with the driving motor 102, the first load motor 105 and the second load motor 106;
- controlling actions and operation parameters of the driving motor 102, the first load motor 105 and the second load motor 106 according to load parameters;
- acquiring gearbox performance parameters of the gearbox 200; and
- judging, according to the gearbox performance parameters, whether the gearbox 200 meets predetermined off-line conditions, and prompting that the gearbox 200 does not meet off-line requirements if the predetermined off-line conditions are not met.

The gearbox off-line detection method according to the embodiment of the application has the advantages of the gearbox off-line detection device according to the embodiments of the present application.

In the gearbox off-line detection method according to some embodiments, the load parameters include whole vehicle load spectrum data of a vehicle suitable for the gearbox 200.

In combination with FIGS. 1 to 7, the gearbox off-line detection device, the gearbox off-line detection system and the gearbox off-line detection method according to the embodiments of the present application will be further described.

As shown in FIGS. 2, 3 and 4, the gearbox off-line detection device 100 according to the embodiments of the present application includes the base 101, the driving motor 102, the tooling fixture 104, the first load motor 105 and the second load motor 106. The gearbox off-line detection device 100 is fixed by the base 101. The gearbox 200 to be detected is respectively drivingly connected with the driving motor 102, the first load motor 105 and the second load motor 106 through transmission devices. When the gearbox 200 to be detected is detected, the gearbox 200 is fixed on the base 101 through the tooling fixture 104.

The tooling fixture 104 includes the H-shaped steel 1041 as the upright post, the mounting plate 1042 as the gearbox bearing part, the first lead screw-nut transmission mechanism 1043 as the first position adjustment part, the tray 1044 as the supporting part, and the mounting seat 1045 and the second lead screw-nut transmission mechanism 1046 as the second position adjustment part.

The first lead screw-nut transmission mechanism 1043 includes the first lead screw and the first nut in threaded engagement with the first lead screw. The first lead screw extends in the horizontal direction and is rotationally disposed on the base 101 around its own axis, and the first nut is fixed on the tray 1044.

Vertical plates on both sides of the H-shaped steel 1041 are provided with a plurality of rows of small holes which are evenly distributed in the vertical direction as the first connecting holes, and the mounting seat 1045 is fixedly connected with the upright post through a fixed connector penetrating the second connecting hole and part of the first connecting holes.

The second lead screw-nut transmission mechanism 1046 includes the second lead screw and the second nut in threaded engagement with the second lead screw. The second lead screw extends in the vertical direction and is rotationally disposed on the mounting seat 1045 around its own axis, and the second nut is fixed on the mounting plate 1042. The lower end of the H-shaped steel 1041 is fixed on the tray 1044 by bolts, and the middle part of the tray 1044 is fixedly connected with the first nut of the first lead screw-nut transmission mechanism 1043. The left and right positions of the gearbox 200 can be adjusted by rotating the first lead screw. The mounting plate 1042 can be adjusted up and down by changing a mounting position of the mounting seat 1045 or rotating the second lead screw according to the height of the gearbox 200.

Figure 5:
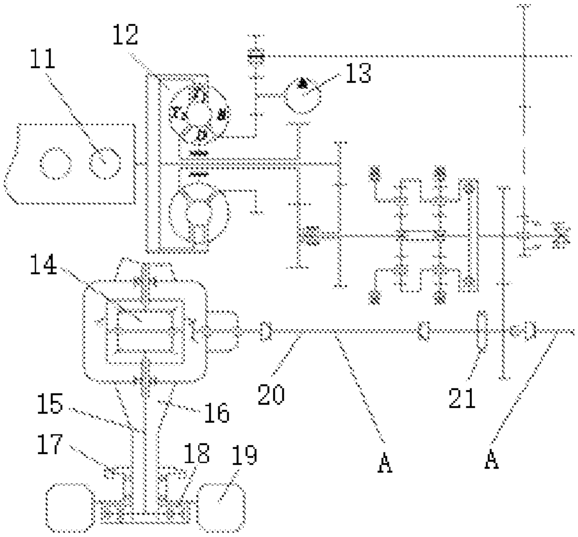
FIG. 5 is a schematic diagram of a working principle of a power transmission system of an exemplary whole vehicle suitable for the gearbox to be detected and for load spectrum collection.

FIG. 5 is a schematic diagram of the working principle of a power transmission system of an exemplary whole vehicle suitable for the gearbox to be detected and for load spectrum collection. The power transmission system is used to test and collect a load spectrum of the power transmission system. As shown in FIG. 5, the power transmission system includes an engine 11, a hydraulic torque converter 12, a steering pump 13, a main speed reducer 14, a drive axle 15, an axle housing 16, a caliper disc brake 17, a wheel speed reducer 18, tires 19, a transmission shaft 20 and a clutch 21. Transmission shaft torque detection points A are, for example, disposed on both sides of the clutch 21 on the transmission shaft 20. The two transmission shaft torque detection points A are the positions where a first output rotational speed, a first output torque, a second output rotational speed and a second output torque are detected.

When the load spectrum of the power transmission system is tested, representative typical test working conditions are selected to test and determine a load spectrum architecture. Through an engine controller area network (CAN) signal, an input rotational speed $n_e$ and an actual torque percentage $l_e$ can be acquired. By disposing a gear position signal device, a rotational speed sensor and a torque sensor for the gearbox, a gearbox gear position m, two output rotational speeds $n_o$ and two output torques $M_o$ can be acquired. An input torque can be acquired by the actual torque percentage. The rotational speed is measured by a non-contact sensor. The torque is measured by a resistance strain sensor. The acquired load spectrum data of the whole vehicle is as shown in Table 1, and the fretting property of the actual working conditions of the whole vehicle can be collected.

TABLE 1

| Whole vehicle load | | | | | | |
|---|---|---|---|---|---|---|
| Working condition point 1 | Input rotational speed | Input torque | First output rotational speed | First output torque | Second output rotational speed | Second output torque |
| | 1389.467 | 805.31268 | 35.576 | 164.458 | 36.664 | 152.561 |
| | 1388.935 | 804.80359 | 35.528 | 173.180 | 36.579 | 157.946 |
| | 1388.403 | 804.19983 | 35.503 | 192.469 | 36.495 | 175.724 |
| | 1387.339 | 804.64148 | 35.283 | 216.580 | 36.325 | 193.952 |
| | 1386.807 | 804.71118 | 35.214 | 208.771 | 36.155 | 153.692 |
| | . . . | . . . | . . . | . . . | . . . | . . . |
| Working condition point 2 | . . . | . . . | . . . | . . . | . . . | . . . |
| Working condition point 3 | . . . | . . . | . . . | . . . | . . . | . . . |
| . . . | . . . | . . . | . . . | . . . | . . . | . . . |

The collected data is processed, including data preprocessing, data classification processing, operation working condition time proportion statistics, rain flow counting analysis and output processing.

The data preprocessing includes: a basic time axis is selected to determine relative sampling time of the data of each data point on the basic time axis; the sampling moment of each data point refers to the basic time axis, and according to a preset reasonable value range of each data at the corresponding sampling moment, the abnormal value of load spectrum related data at each data point is judged and processed; and invalid data is deleted.

For the data classification processing: according to collected signal values, data values are classified and judged according to the working condition data.

According to the data classified and judged by the working conditions, the time proportion statistics of each operation working condition are carried out.

The data is subjected to rain flow counting analysis, so as to acquire the information such as an average amplitude of the loads corresponding to respective working condition points and the corresponding frequency.

The load spectrum data after rain flow counting analysis is output to the gearbox off-line detection device 100, the input rotational speed and the input torque are assigned to the driving motor 102, the first output rotational speed and the first output torque are assigned to the first load motor 105, and the second output rotational speed and the second output torque are assigned to the second load motor 106.

As shown in FIG. 6, the control device 300 of the gearbox off-line detection system includes the controller 310, the load control unit 320, the hydraulic torque converter detection unit 330, the clutch pack detection unit 340, the gear shifting impact detection unit 350, the abnormal sound detection unit 360 and the alarm unit 370. The state early warning of each part of the gearbox can be realized. In the present embodiment, the alarm unit 370 includes the buzzer 371.

The controller 310 and other respective units are connected by data communication cables. The controller 310 may be implemented as a general-purpose processor, a programmable logic controller (PLC), a digital signal processor (DSP), an application specific integrated circuit (ASIC), a field-programmable gate array (FPGA) or other programmable logic devices, discrete gate or transistor logic devices, discrete hardware components or any suitable combination thereof for executing the functions described in the present disclosure.

The load control unit 320 sends the collected and then processed load spectrum data of the whole vehicle to the controller 310, the controller 310 sends a rotational speed control instruction and a torque control instruction, and the control instructions are used to control the rotational speeds and the torques of the driving motor 102, the first load motor 105 and the second load motor 106 to preset values. The load control unit 320 may be an input/output module, or a data storage module and other devices that can provide the load spectrum data for the controller 310 as the load parameters.

As shown in FIG. 7, in the present embodiment, the buzzer 371 has four alarm ways. When the hydraulic torque converter is detected to exceed a limit value, the alarm instruction indicates hydraulic torque converter alarming, and the buzzer 371 is red, corresponding to the torque converter alarm information; when the clutch pack is detected to exceed a limit value, the alarm instruction indicates clutch pack alarming, and the buzzer 371 is yellow, corresponding to the clutch pack alarm information; when the gear shifting impact is detected to exceed a limit value, the alarm instruction indicates gear shifting impact alarming, and the buzzer 371 is blue, corresponding to the gear shifting impact alarm information; and when the abnormal sound is detected to exceed a limit value, the alarm instruction indicates abnormal sound alarming, and the buzzer 371 is green, corresponding to the abnormal sound alarm information.

In an embodiment not shown, the alarm way of the buzzer 371 may be set to other colors. Alternatively, the alarm unit 370 may be set as other alarm devices, and may alarm in other alarm ways, such as a voice alarm and a display alarm.

The hydraulic torque converter detection unit 330 includes the temperature sensor 331, the torque converter pressure sensor 332, and the rotational speed sensor 333. In the hydraulic torque converter detection unit 330, the torque converter inlet oil temperature and/or the torque converter outlet oil temperature of the hydraulic torque converter are/is detected by the temperature sensor 331, the torque converter inlet pressure and/or the torque converter outlet pressure of the hydraulic torque converter are/is detected by the pressure sensor, and the impeller turbine rotational speed of the hydraulic torque converter is detected by the rotational speed sensor 333. The controller 310 judges whether the received values of temperature, pressure and rotational speed are within the predetermined ranges, if so, the detection is continued, and if one or more are not, the buzzer 371 is red.

In some examples, the range of the torque converter inlet oil temperature may be, for example, 15° C.-35° C.; the range of the torque converter outlet oil temperature may be, for example, 40° C.-80° C.; the range of the torque converter inlet pressure may be, for example, 0.23 MPa-0.78 MPa; the range of the torque converter outlet pressure may be, for example, 0.13 MPa-0.65 MPa; and the range of the impeller turbine rotational speed may be, for example, 600 rpm-3000 rpm.

The clutch pack detection unit 340 includes the flow sensor 342, the clutch pack pressure sensor 343, the torque sensor 344 and the clutch pack timer 341. In the clutch pack detection unit 340, the clutch pack inlet and outlet flows are detected by the flow sensor 342, the clutch pack inlet pressure and/or outlet pressure are/is detected by the pressure sensor, the clutch pack output torque is detected by the torque sensor 344, and the first time $t_F$ from the start of oil feeding to the complete elimination of a friction plate clearance of the clutch pack and the second time $t_E$ from the start of torque transmission to stable torque transmission of the clutch pack are detected by the clutch pack timer 341. The controller 310 determines whether $t_F$ is less than the predetermined first time threshold $t_1$ and $t_E$ is less than the predetermined second time threshold $t_2$. If yes, the detection is continued, and if one or more are not, the buzzer 371 is yellow.

In some examples, the first time threshold $t_1$ may be, for example, 0.4s; and the second time threshold $t_2$ may be, for example, 0.1s.

In the present embodiment, whether the clutch pack output torque, the clutch pack inlet pressure and/or outlet pressure, and the clutch pack inlet and outlet flow values are within the predetermined ranges is only used as a reference, and not as a basis for evaluating gear shifting waiting.

The gear shifting impact detection unit 350 includes the gear shifting impact counter 351 and the vibration acceleration sensor 352. In the gear shifting impact detection unit 350, the gear shifting delay time $t_g$(s) is detected by the gear shifting impact counter 351, and the acceleration value of a monitoring position is detected by the vibration acceleration sensor 352. Through the detected acceleration value, four indexes are extracted: the gear shifting impact degree $a_c$, the gear shifting acceleration amplitude $a_f$, the gear shifting acceleration flutter aa and the gear shifting vibration dose value $a_j$.

The mounting position of the vibration acceleration sensor 352 determines the monitoring position of acquiring the acceleration value. Mounting principles of the vibration acceleration sensor 352 are safety first, a transmission path as short as possible and preferred maximum rigidity, and the general bearing position is the optimal selection point. The gear shifting impact degree $a_c$ is the maximum value of a longitudinal acceleration slope of the vehicle in the engagement process of a target gear position of clutch, and its unit is $m/s^3$. The gear shifting acceleration amplitude $a_f$ is the maximum value of a longitudinal acceleration of the vehicle in the engagement process of the target gear position of clutch, and its unit is $m/s^2$. The gear shifting acceleration flutter $a_d$ is the acceleration amplitude second to the maximum longitudinal acceleration amplitude in the engagement process of the target gear position of clutch, and its unit is $m/s^2$. The gear shifting vibration dose value (VDV) $a_j$ is calculated on the basis of the fourth power of an acceleration time course in the gear position shifting process, and its unit is $m/s^{1.75}$.

The gear shifting quality parameter a is acquired according to the gear shifting delay time $t_g$, the gear shifting impact degree $a_c$, the gear shifting acceleration amplitude $a_f$, the gear shifting acceleration flutter aa and the gear shifting vibration dose value $a_j$;

$$a = At_g + Ba_c + Ca_f + Da_d + Ea_j;$$

wherein A, B, C, D and E are coefficients used in calculation of the gear shifting quality parameter a. The specific values of respective coefficients may be set by, for example, an analytic hierarchy process.

In some examples, the values of A, B, C, D and E may be, for example, 0.09, 0.41, 0.26, 0.15 and 0.09 respectively.

The controller 310 determines whether the value of the gear shifting quality parameter a is within the predetermined gear shifting quality parameter range, if so, the detection is continued, and if not, the buzzer 371 is blue.

In some examples, the predetermined gear shifting quality parameter range may be, for example, 6-8.

The abnormal sound detection unit 360 includes the microphone 361. The noise is detected by the microphone 361, and the loudness $N_{10}$ is extracted from the detected noise value, that is, the time of the loudness level $N_{10}$ in a signal duration is 10% (which is equal to or greater than the percentile loudness value in 10% of the measurement time period). By taking $N_{10}$ as an abnormal sound evaluation index, the controller 310 determines whether the received loudness $N_{10}$ value is within the predetermined loudness range, if so, the detection is continued, and if not, the buzzer 371 is green.

In some examples, the predetermined loudness range may be, for example, 40Sone-70Sone.

According to the above descriptions, it can be known that the gearbox off-line detection device, the gearbox off-line detection system and the gearbox off-line detection method according to the embodiments of the present application have at least one of the following technical effects:

In the gearbox off-line detection devices with a single-input and single-output mode of the related art, which is different from a single-input and two-output mode of the whole vehicle, it is difficult to reproduce the problems on the whole vehicle. The gearbox off-line detection device, system and method according to the embodiments of the present application are matched with the single-input and two-output power transmission system matched with the whole vehicle, which is beneficial to reproduce the problems on the whole vehicle.

The gearbox off-line detection devices and systems in the related art only have pressure, gear shifting and other signals, and cannot collect the impact and abnormal sound performance signals. The gearbox off-line detection device, system and method according to the embodiments of the present application can judge and give early warning to the impact performance and abnormal sound performance of the gearbox.

The gearbox off-line detection system and the gearbox off-line detection method according to the embodiments of the present application can collect multiple performance parameters of the gearbox, such as the hydraulic torque converter performance parameters, the clutch pack performance parameters, the gear shifting impact parameters and the noise parameters, and give early warning to corresponding problems respectively, so that the problems are easy to trace back.

The gearbox off-line detection devices in the related art cannot quantitatively judge whether the gearboxes can leave the factory. By setting the predetermined off-line conditions, the gearbox off-line detection system and the gearbox off-line detection method according to the embodiments of the present application can quantitatively judge whether the gearboxes are qualified for off-line leaving or not, the evaluation standards are unified and the efficiency is high.

In the related art, automatic programs of the gearbox off-line detection devices are basically set working conditions, lacking the actual load spectrum matched with the whole vehicle. For the gearbox off-line detection system and method according to the embodiments of the present application, the load spectrum data of the whole vehicle is assigned to the gearbox off-line detection system, thereby changing the situation that the working conditions are manually set for gearbox off-line detection.

Finally, it should be noted that the above embodiments are only used for describing rather than limiting the technical solutions of the present application. Although the present application is described in detail with reference to the preferred embodiments, those of ordinary skill in the art should understand that they still can make modifications to the specific implementations in the present application or make equivalent substitutions to part of technical features thereof; and such modifications and equivalent substitutions should be encompassed within the technical solutions sought for protection in the present application.

The invention claimed is:

1. A gearbox off-line detection device, comprising:

a base;

a driving motor disposed on the base and configured to be drivingly connected with a gearbox to be detected;

a tooling fixture disposed on the base and configured to support the gearbox;

a first load motor disposed on the base and configured to be drivingly connected with the gearbox; and a second load motor disposed on the base and configured to be drivingly connected with the gearbox:

wherein the tooling fixture comprises:

a supporting part:

a first position adjustment part connected between the base and the supporting part and configured to adjust a relative position of the supporting part with the base in the horizontal direction;

an upright post, the bottom end of which being connected with the supporting part;

a gearbox bearing part for bearing the gearbox; and a second position adjustment part connected between the upright post and the gearbox bearing part and configured to adjust a relative position of the gear box bearing part with the upright post in the vertical direction.

2. The gearbox off-line detection device according to claim 1, wherein the position of the gearbox bearing part relative to the base in a vertical direction is adjustable.

3. The gearbox off-line detection device according to claim 1, wherein the first position adjustment part comprises a first lead screw-nut transmission mechanism, the first lead screw-nut transmission mechanism comprises a first lead screw and a first nut in threaded engagement with the first lead screw, the first lead screw extends in the horizontal direction and is rotationally disposed on the base around its own axis, and the first nut is connected to the supporting part; and/or the second position adjustment part comprises a second lead screw-nut transmission mechanism, the second lead screw-nut transmission mechanism comprises a second lead screw and a second nut in threaded engagement with the second lead screw, the second lead screw extends in the vertical direction and is rotationally disposed on the upright post around its own axis, and the second nut is connected to the gearbox bearing part; and/or the second position adjustment part comprises a mounting seat, the gearbox bearing part is connected to the mounting seat, the upright post is provided with a plurality of rows of first connecting holes in the vertical direction, the mounting seat comprises a second connecting hole selectively matched with part of first connecting holes in the plurality of rows of first connecting holes, and the mounting seat is fixedly connected with the upright post through a fixed connector penetrating the second connecting hole and the part of first connecting holes.

4. The gearbox off-line detection device according to claim 3, wherein the second position adjustment part comprises the second lead screw-nut transmission mechanism and the mounting seat, and the gearbox bearing part is connected to the mounting seat through the second lead screw-nut transmission mechanism.

5. The gearbox off-line detection device according to claim 1, wherein the first load motor and the second load motor are coaxially disposed on both sides of the tooling fixture.

6. A gearbox off-line detection system, comprising a gearbox off-line detection device and a control device;

wherein the gearbox off-line detection device comprises:

a base;

a driving motor disposed on the base and configured to be drivingly connected to a gearbox to be detected, a tooling fixture disposed on the base and configured to support the gearbox;

a first load motor disposed on the base and configured to be drivingly connected with the gearbox; and a second load motor disposed on the base and configured to be drivingly connected with the gearbox, wherein the control device is in signal connection with the driving motor, the first load motor and the second load motor to control actions and operation parameters of the driving motor, the first load motor and the second load motor; and wherein the control device comprises:

a controller;

a load control unit in signal connection with the controller and configured to send load parameters to the controller, the controller controlling the actions and operation parameters of the driving motor, the first load motor and the second load motor according to the load parameters;

at least one detection unit, which is in signal connection with the controller and configured to detect gearbox performance parameters of the gearbox, the controller is configured to judge whether predetermined off-line conditions are met according to the gearbox performance parameters, and forming an alarm instruction if the predetermined off-line conditions are not met; and an alarm unit, which is in signal connection with the controller and configured to send alarm information according to the alarm instruction.

7. The gearbox off-line detection system according to claim 6, wherein the control device comprises a plurality of detection units, the controller judges whether the predetermined off-line conditions are met according to the gearbox performance parameters detected by different detection units and sends different alarm instructions if the predetermined off-line conditions are not met, and the alarm unit sends different alarm information according to different alarm instructions.

8. The gearbox off-line detection system according to claim 7, wherein the alarm unit comprises a buzzer, and the different alarm information comprises different color light signals sent by the buzzer.

9. The gearbox off-line detection system according to claim 6, wherein the at least one detection unit comprises:

a hydraulic torque converter detection unit configured to detect torque converter performance parameters of a hydraulic torque converter of the gearbox, wherein the gearbox performance parameters comprise the torque converter performance parameters, the alarm unit sends torque converter alarm information in a state that the torque converter performance parameters are inconsistent with torque converter predetermined conditions, the predetermined off-line conditions comprise the torque converter predetermined conditions, and the alarm information comprises the torque converter alarm information; and/or a clutch pack detection unit configured to detect clutch pack performance parameters of a clutch pack of the gearbox, wherein the gearbox performance parameters comprise the clutch pack performance parameters, the alarm unit sends clutch pack alarm information in a state that the clutch pack performance parameters are inconsistent with clutch pack predetermined conditions, the predetermined off-line conditions comprise the clutch pack predetermined conditions, and the alarm information comprises the clutch pack alarm information; and/or a gear shifting impact detection unit configured to detect gear shifting impact parameters of the gearbox, wherein the gearbox performance parameters comprise the gear shifting impact parameters, the alarm unit sends gear shifting impact alarm information in a state that the gear shifting impact parameters are inconsistent with gear shifting impact predetermined conditions, the predetermined off-line conditions comprise the gear shifting impact predetermined conditions, and the alarm information comprises the gear shifting impact alarm information; and/or an abnormal sound detection unit configured to detect noise parameters of the gearbox, wherein the gearbox performance parameters comprise the noise parameters, the alarm unit sends abnormal sound alarm information in a state that the noise parameters are inconsistent with abnormal sound predetermined conditions, the predetermined off-line conditions comprise the abnormal sound predetermined conditions, and the alarm information comprises the abnormal sound alarm information.

10. The gearbox off-line detection system according to claim 9, wherein the hydraulic torque converter detection unit comprises:

a temperature sensor configured to detect a torque converter inlet oil temperature and/or a torque converter outlet oil temperature of the hydraulic torque converter, wherein the torque converter performance parameters comprise the torque converter inlet oil temperature and/or the torque converter outlet oil temperature, and the torque converter predetermined conditions comprise that the torque converter inlet oil temperature is in a predetermined torque converter inlet temperature range and/or the torque converter outlet oil temperature is in a predetermined torque converter outlet temperature range; and/or a torque converter pressure sensor configured to detect a torque converter inlet pressure and/or a torque converter outlet pressure of the hydraulic torque converter, wherein the torque converter performance parameters comprise the torque converter inlet pressure and/or the torque converter outlet pressure, and the torque converter predetermined conditions comprise that the torque converter inlet pressure is in a predetermined torque converter inlet pressure range and/or the torque converter outlet pressure is in a predetermined torque converter outlet pressure range; and/or a rotational speed sensor configured to detect an impeller turbine rotational speed of the hydraulic torque converter, wherein the torque converter performance parameters comprise the impeller turbine rotational speed, and the torque converter predetermined conditions comprise that the impeller turbine rotational speed is in a predetermined impeller turbine rotational speed range.

11. The gearbox off-line detection system according to claim 9, wherein the clutch pack detection unit comprises a clutch pack timer, the clutch pack timer is configured to detect first time $t_F$ from the start of oil feeding to the complete elimination of a friction plate clearance of the clutch pack of the gearbox and second time $t_E$ from the start of torque transmission to stable torque transmission of the clutch pack, the clutch pack performance parameters comprise the first time $t_F$ and/or the second time $t_E$, the clutch pack predetermined conditions comprise that the first time $t_F$ is less than a predetermined first time threshold $t_1$ and/or the second time $t_E$ is less than a predetermined second time threshold $t_2$.

12. The gearbox off-line detection system according to claim 11, wherein the clutch pack detection unit comprises:

a flow sensor configured to detect a clutch pack inlet flow and/or a clutch pack outlet flow of the clutch pack; and/or a clutch pack pressure sensor configured to detect a clutch pack inlet pressure and/or a clutch pack outlet pressure of the clutch pack; and/or a torque sensor configured to detect a clutch pack output torque of the clutch pack.

13. The gearbox off-line detection system according to claim 9, wherein the gear shifting impact detection unit comprises:

a gear shifting impact counter configured to detect gear shifting delay time $t_g$, and a vibration acceleration sensor configured to detect an acceleration value of a monitoring position;

wherein the gear shifting impact parameters comprise the gear shifting delay time $t_g$ and the acceleration value, and the gear shifting impact predetermined conditions comprise that a gear shifting quality parameter a acquired according to the gear shifting delay time $t_g$ and the acceleration value is in a predetermined gear shifting quality parameter range.

14. The gearbox off-line detection system according to claim 13, wherein the industrial controller is configured to:

acquire a gear shifting impact degree $a_c$, a gear shifting acceleration amplitude $a_f$, a gear shifting acceleration flutter $a_d$ and a gear shifting vibration dose value $a_j$ according to the acceleration value; and acquire the gear shifting quality parameter a according to the gear shifting delay time $t_g$, the gear shifting impact degree $a_c$, the gear shifting acceleration amplitude $a_f$, the shift acceleration flutter $a_d$ and the gear shifting vibration dose value $a_j$, wherein:

$$a=At_g+Ba_c+Ca_f+Da_d+Ea_j;\text{ and}$$

A, B, C, D and E are coefficients used in calculation of the gear shifting quality parameter a.

15. The gearbox off-line detection system according to claim 9, wherein the abnormal sound detection unit comprises a microphone, the microphone is configured to detect a noise value of the gearbox, the controller is configured to acquire a loudness $N_{10}$ according to the noise value, the noise parameters comprise the loudness $N_{10}$, and the abnormal sound predetermined conditions comprise that the loudness $N_{10}$ is in a predetermined loudness range.

16. A gearbox off-line detection method for gearbox off-line detection according to the gearbox off-line detection system in claim 6, comprising the following steps:

drivingly connecting the gearbox to be detected with the driving motor, the first load motor and the second load motor;

controlling actions and operation parameters of the driving motor, the first load motor and the second load motor according to load parameters;

acquiring gearbox performance parameters of the gearbox; and judging, according to the gearbox performance parameters, whether the gearbox meets predetermined off-line conditions, and prompting that the gearbox does not meet off-line requirements if the predetermined off-line conditions are not met.

17. The gearbox off-line detection method according to claim 16, wherein the load parameters comprise whole vehicle load spectrum data of a vehicle suitable for the gearbox.

* * * * *